United States Patent [19]
Dannoux et al.

[11] Patent Number: 5,960,143
[45] Date of Patent: Sep. 28, 1999

[54] PROTECTIVE HOUSING FOR AN INTEGRATED OPTICAL COMPONENT

[75] Inventors: Thierry Luc Alain Dannoux, Avon; Eric Jean Henri Firtion, Mairy sur Marne, both of France

[73] Assignee: Corning, Inc., Corning, N.Y.

[21] Appl. No.: 08/913,005

[22] PCT Filed: Feb. 13, 1996

[86] PCT No.: PCT/US96/01931

§ 371 Date: Aug. 18, 1997

§ 102(e) Date: Aug. 18, 1997

[87] PCT Pub. No.: WO96/25679

PCT Pub. Date: Aug. 22, 1996

[30] Foreign Application Priority Data

Feb. 17, 1995 [FR] France .................................. 95 01862

[51] Int. Cl.$^6$ .................................................. G02B 6/36
[52] U.S. Cl. ................................ 385/92; 385/49; 385/50; 385/94

[58] Field of Search .................................. 385/49, 50, 88, 385/92, 94

[56] References Cited

U.S. PATENT DOCUMENTS

| | | | |
|---|---|---|---|
| 5,444,804 | 8/1995 | Yui et al. | 385/49 |
| 5,463,708 | 10/1995 | Yui et al. | 385/49 |
| 5,481,632 | 1/1996 | Hirai et al. | 385/49 |

*Primary Examiner*—Phan T. H. Palmer
*Attorney, Agent, or Firm*—William J. Chervenak

[57] ABSTRACT

The optical component [4] consists of a substrate made of an optical material that carries at least one integrated waveguide and that is extended beyond the said substrate by optical fibers exiting from the protective housing [1] [3] for the component. The housing defines a closed internal cavity [2] in which the said component [4] is placed. In accordance with the invention, the said cavity [2] is sized such as to hold the component [4] with a certain amount of play $[j_i]$ that prevents any significant transmission of stresses between the housing [1] [3] and the component [4].

10 Claims, 2 Drawing Sheets

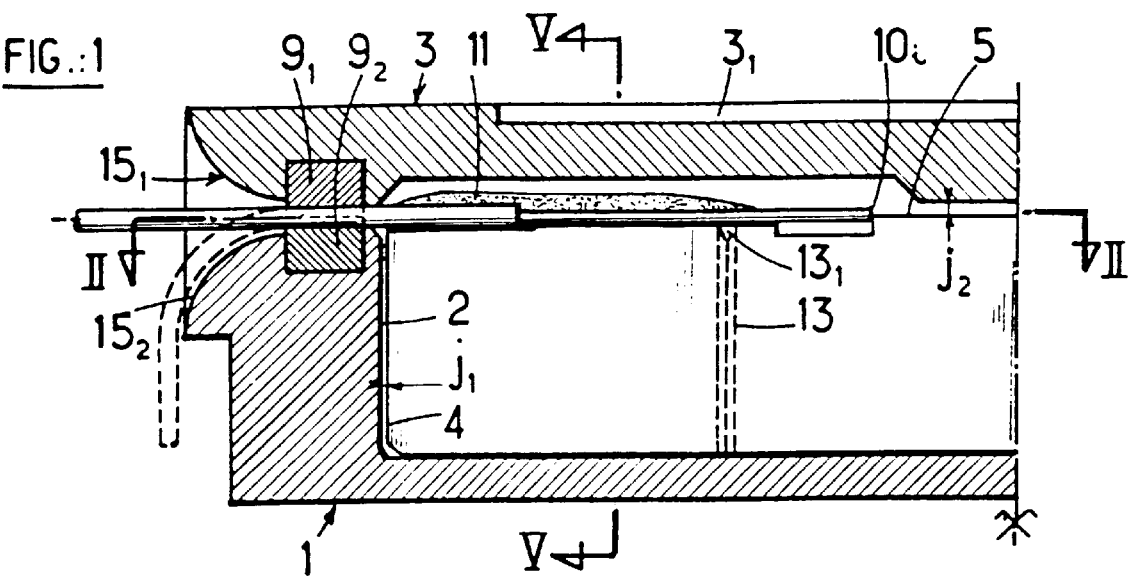
FIG.:1
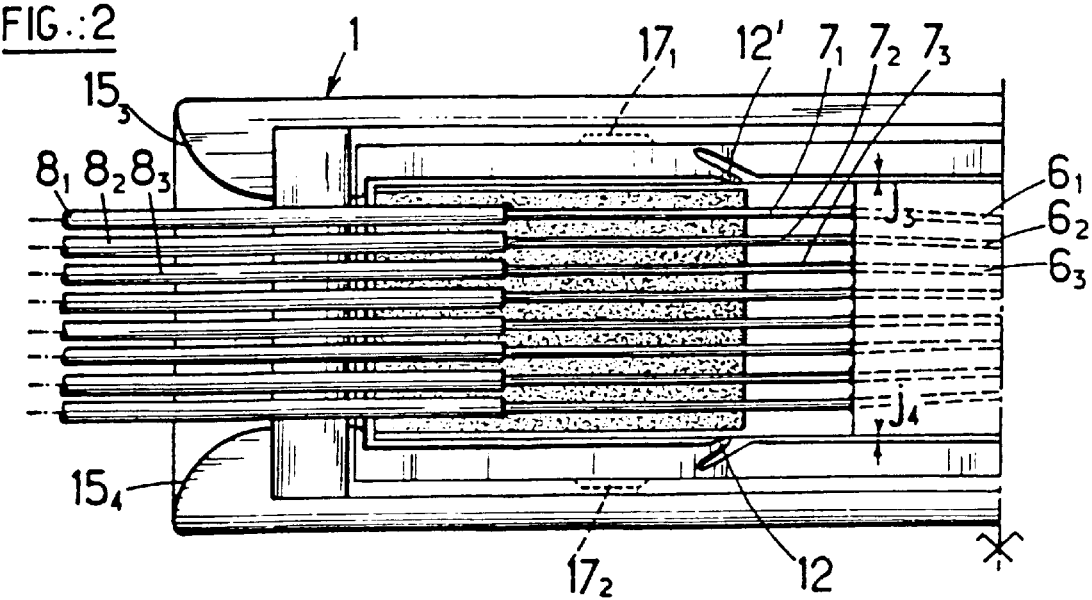
FIG.:2

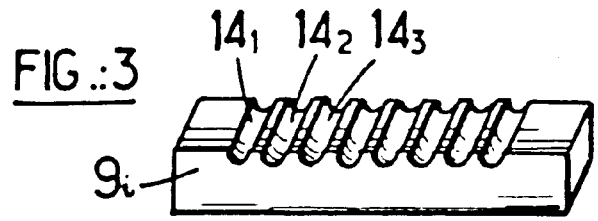
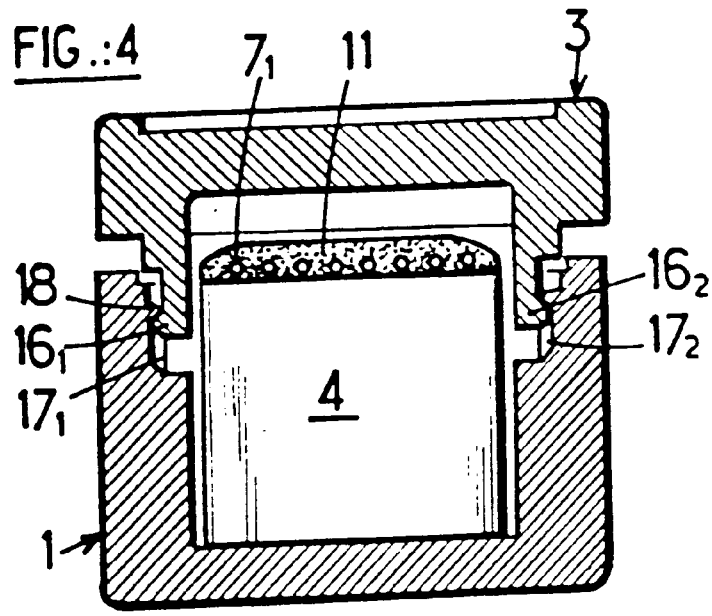
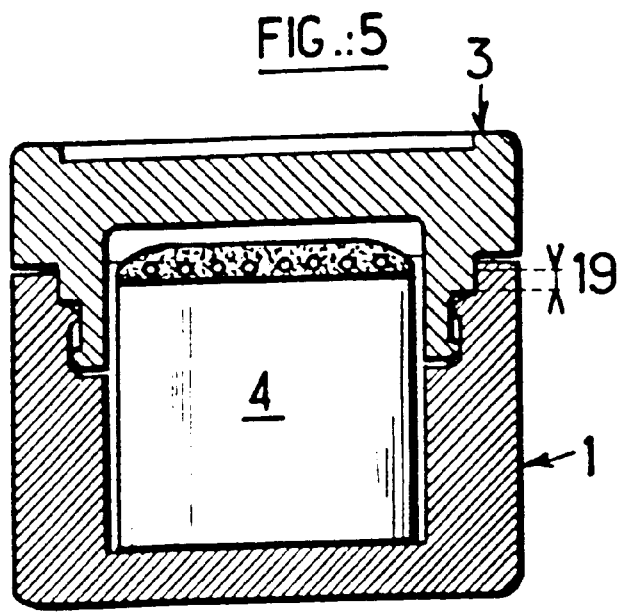

PROTECTIVE HOUSING FOR AN INTEGRATED OPTICAL COMPONENT

CROSS-REFERENCE TO RELATED APPLICATIONS

This application is based upon French Patent Application No. 95/01862, filed Feb. 7, 1995, the content of which is relied upon and incorporated herein by reference in its entirety, and the benefit of priority under 35 U.S.C. § 119 i hereby claimed.

BACKGROUND OF THE INVENTION

The present invention relates to a protective housing for an optical component and, more specifically, to such a housing that has been designed to protect a component that consists of a substrate made of an optical material that carries at least one integrated waveguide and that is extended, beyond the said substrate, by optical fibers exiting from the housing, which defines a closed internal cavity in which the said component is placed.

RELATED ART

In particular, such housings are used to protect integrated optical components such as couplers or multiplexers associated with fiber optics for the long-distance transmission of digital or analog information of the type used for example in applications such as audio, video, or data processing. The integrated optical components take the form of a plate or a bar made of a crystalline material or an amorphous optical material, such as glass, with waveguides that have been formed for example by the diffusion of ions being embedded under one surface of the plate or the bar. The ends of the waveguides are connected to optical fibers that exit from the housing that protects the component.

Such a component is fragile and must be protected effectively from the application of mechanical stresses and constraints that could break it, and from other physical or chemical phenomena that could damage it, including particularly variations in temperature or contact with water caused by the humidity of the air. For these reasons the component is currently enclosed within a hermetically sealed and rigid container, with a photosetting or thermosetting resin filling the space left free inside the housing by the component, in order to prevent any entry of moist air or air that contains other damaging ingredients. It can readily be understood how, when such a set of different and integrally joined materials is subjected to broad variations in temperature, such as the ones that are imposed by the test standards applicable to these components, the stresses and constraints caused by differential thermal expansions can break the component located inside the housing.

In order to remedy this disadvantage, in European patent No. 106 116 it was proposed that the component be mounted inside the housing on a support made of a material that has the same coefficient of thermal expansion as the glass, such as the iron-nickel alloy known under the name of INVAR ™, with this support in turn being attached to a tubular screen made of the same material. The result is a fairly complex protective structure that contains a large number of parts to be assembled.

SUMMARY OF THE INVENTION

The goal of the present invention is to provide a protective housing for an integrated optical component, with this housing being designed in such a way as to prevent damage to, or breakage of, this component as a result of the effect of stresses and constraints of various origins, and particularly the ones that are caused by differential thermal expansions, while still having a simple structure and lending itself to automatic assembly and closure.

These goals of the invention, along with others that will become clear from a reading of the following description, are obtained through a protective housing for an optical component that consists of a substrate made of an optical material that includes at least one integrated waveguide and that is extended, beyond the said substrate, by optical fibers that exit from the housing, which housing defines a closed internal cavity in which the said component is placed, with this housing being notable in that the said cavity is sized such as to hold the said component with an amount of play that prevents any significant transmission of stress, strain, or pressure between the house and the component.

Because of this amount of play, the housing is uncoupled or isolated from the optical component in terms of the transmission of any mechanical stresses applied to the housing by handling, vibrating supports, attachment straps, etc., or by differential thermal expansions. Thus, this uncoupling protects the fragile component from the application of such stresses that are capable of breaking or damaging it.

In accordance with a preferred embodiment of the invention, the housing includes at least one flexible unit that is pressed lightly between two surfaces facing the component and the cavity in the housing, in order to prevent any potential vibrations of the component in the cavity.

BRIEF DESCRIPTION OF DRAWINGS

Other characteristics and advantages of the housing in accordance with the invention will become clear from a reading of the following description and an examination of the attached drawing, on which:

FIG. 1 is a partial longitudinal cross-sectional view of the housing in accordance with the invention, fitted with the integrated optical component that it protects;

FIG. 2 is a partial view of the bottom of the housing shown in FIG. 1, taken along the sectional line II—II in FIG. 1;

FIG. 3 represents a perspective view of a watertight joint that forms part of the housing in accordance with the invention, and FIGS. 4 and 5 are transverse cross-sectional views of the housing in accordance with the invention, in the pre-assembly position and in the assembled position, respectively.

DETAILED DESCRIPTION OF THE INVENTION

Reference shall now be made to FIGS. 1 and 2 on the attached drawing, in which partial cross-sectional views of the housing in accordance with the invention have been provided. The housing is oblong in shape and symmetrical overall in relation to a plane P, and thus displays two ends, as represented in these figures.

The housing includes essentially a base [1] that contains a cavity [2] which is generally parallelepipedal and closed by a lid [3]. The lid contains a recess [3₁] that is suitable for receiving a self-adhesive label that identifies the component contained in the housing. The cavity [2] in the base is shaped so as to receive an integrated optical component [4] whose shape is generally complementary. This component is traditionally produced with the aid of a substrate made of an optical material, such as glass, or a crystalline material. Waveguides [6₁] [6₂] [6₃], etc., produced for example through ion diffusion, are embedded under the upper surface [5] of the component (see FIG. 2). Each of the ends of the guides is connected to one end of a bare optical fiber [7₁] [7₂] [7₃], etc., with this fiber being covered by a protective envelope [8₁] [8₂] [8₃], etc. before exiting from the housing between two watertight joints [9₁] and [9₂]. The connection of each fiber to the end of the corresponding waveguide can be ensured by a drop of an adhesive product [10₁] while another, larger drop of an adhesive product [11] ensures the mechanical bond between the substrate and the set of fibers Such an integrated optical component is well known, for example, through French patent application No. 2 674 033, filed by the present applicant. Such a component may consist of a coupler with M inputs and N outputs, or else a multiplexer, in which case the number of fibers that exit from one end of the housing is generally different from the number of fibers that exit from the other end of the same housing.

In accordance with an important characteristic of the present invention, the cavity [2] formed in the housing is sized such as to hold the component [4] with an amount of mechanical play that prevents all significant transmission of stresses between the base [1] and the cover [3] of the housing, on the one hand, and the integrated optical component [4], on the other hand. Thus, due to the fact that the component is simply placed in the cavity [2] without being affixed there by an adhesive product, the component does not form an integral part of the housing, and each of these two elements can then expand freely in relation to one another in the event of variations in temperature, thereby eliminating all application to the component [4] of stresses caused by differential expansions that could damage or even break the component.

The uncoupling makes it possible to select, as a construction material for the housing, a material that is well suited, for example, from the point of view of its resistance to shocks or impacts, or because of its ability to be molded without any need to take into consideration (in practical terms) its coefficient of thermal expansion. Thus, for example, a product could be selected that consists of a liquid-crystal polymer filled with fiberglass, such as the product designated by the name VECTRA A 130 in the catalogues of HOECHST AG And Hoechst Celanese Corporation, or else a polycarbonate.

The amount of play necessary for the uncoupling can be provided all around the component. For example, a certain amount of play [j$_i$] could be provided between the two facing end surfaces of the component and of the housing, with a different amount of play [j₂] being provided between the component and the cover [3] (see FIG. 1), and two other amounts of play [j$_i$] and [j₄] being provided between the facing longitudinal surfaces (see FIG. 2). As an indicative and non-limitative example, for a component that occupies 50 ×5×5 mm of space, each of the amounts of play [j$_i$] could be on the order of approximately 0.3 mm.

Although the presence of these amounts of play make it possible to solve the problem consisting of the absorption of differential thermal expansions, nevertheless under certain circumstances they make possible the vibration of the component inside the housing, as a result of for example of periodic stresses applied to the support to which the housing is attached.

In accordance with a preferred embodiment of the invention, these vibrations are prevented through the provision, in the cavity of the housing, of at least one flexible unit that is shaped in such a way as to be pressed between one surface of the component and one facing wall of the cavity, with an amount of force that is great enough to oppose any initiation of the vibration of the component while remaining small enough to avoid re-establishing a transmission path for the mechanical stresses to which the housing is exposed, or a transmission path for the stresses caused by differential [thermal] expansions.

This unit may advantageously be in the shape of a flexible lip [12] that is molded as a unit with the base [2] of the housing and shaped so as to extend slightly into the cavity in the absence of the component [4]. Several such lips may be provided, for example, two on each of the longitudinal walls of the cavity, as can be seen in FIG. 2. In a variant, the forces developed by these lips may be different, in order to oppose any resonances that may occur as a result of vibrations applied to the housing.

In another variant, these lips may be replaced by flexible ribs [13], as shown by dashed lines in FIG. 1, formed on two facing longitudinal walls of the cavity. The ribbing advantageously has a triangular cross-section and a chamfer [13₁] at the head, in order to facilitate the insertion of the component [4] into the base [1] of the housing.

FIG. 3 shows a preferred embodiment of the watertight joints [9₁] and [9₂] mounted in the recesses in the cover [3] and in the base [1] of the housing, respectively, provided to receive these joints. These joints, which are identical and made of a flexible material (such as for example an elastomer with a very low modulus of elasticity), have a series of gutters [14₁] [14₂] [14₃], etc., that are parallel and generally semi-cylindrical, each of which adapts closely to one of the fibers in its protective envelope [8₁] [8₂] [8₃], etc. in a flat ribbon exiting from the housing. With a pair of such joints clamping the ribbon, the physical watertightness of the housing at the point at which the fibers enter and exit is ensured. Thanks to the nature of the material of which they are made, these joints do not however prevent a slow migration of water vapor, from the inside of the housing toward the outside, when the temperature inside the housing may cause an increase in the relative pressure of this water vapor to a value that may be damaging to the component.

As shown in FIGS. 1 and 2, the outlets of these entries and exits toward the outside of the housing have rounded profiles [15₁] [15₂] [15₃], etc., in the plane of the ribbons (see FIG. 2) and also in a plane that is orthogonal to the latter plane (see FIG. 1). Thus, the fibers that exit from the housing can be drawn in directions that diverge from the direction of their axes inside the housing (See the position indicated by a dashed line in FIG. 1), with confidence that the change in direction will be consistent with a certain minimum radius of curvature r (i.e., the radius of curvature of the rounded area against which the fiber rests) that is sufficient to prevent any breakage of the fiber. For example, a radius r=2 mm may be selected.

The base [1] and the cover [3] of the housing may be obtained through the molding of a plastic material and assembled as indicated below, during the course of the assembly of the unit consisting of the optical component and its protective housing.

After the bare fibers [7₁] have been connected to the ends of the waveguides that form an integral part of the substrate of this component, by means of well-known operations consisting of the micro-manipulation of the fibers and the deposition of drops of adhesives, the component is inserted into the cavity [2] in the base [1], with care being taken to ensure that the portions of the fibers located under the fiber envelope [8$_i$] pass through the gutters [14$_i$] in the two joints [9$_1$] [9$_2$] located at the two ends of the base [1]. A water-repellent lubricant, for example, of the so-called "mechanical"type or having a base of silicone, may be injected into the space that separates the component [4] from the walls of the cavity [2], to reinforce the resistance of the component to the moisture present in the air and to other damaging agents that may be carried by this air. This injection should be made with the allowance of an expansion volume for the lubricant, so as to prevent any overpressure effect associated with the expansion of the lubricant.

The cover [3] is then inserted into the base [1], in the pre-assembly position shown diagrammatically in FIG. 4. In this figure it can be seen that several clamping tabs [16$_1$] [16$_2$] extend from the cover in order to penetrate into corresponding slots [17$_1$] [17$_2$] formed in the base, as far as just beyond a peripheral ribbing [18], which the clamping tab passes because of its flexibility, and which then holds the cover [3] onto the base [1], slightly above the later, in a position that allows the cover to be removed easily, if necessary, for example to check or inspect the installation of the component in the housing.

This pre-assembly step makes it possible to handle easily the resulting assembly, until the cover is welded (in a procedure not shown) onto the base, for example, by ultrasonic welding. During this stage the cover is held by an ultrasonic head that places it in the final welding position shown in FIG. 5, which is a view along sectional line V—V in FIG. 1, while transmitting to the lid the proper ultrasonic vibrations for ensuring the welding of the cover [3] to the base [1] at the position of their peripheral surfaces that are in contact, indicated in this figure by reference [19].

It is clear that all of these operations lend themselves to automation of the process consisting of the mounting of the component in its housing.

It is now clear that the invention makes it possible for the established goals to be reached, i.e., through the provision of a protective housing for an integrated optical component that is protected from the effects of possible differential thermal expansions or the mechanical stresses to which the housing may be subjected, with this housing retaining a simple structure that is suitable for the automation of the assembly operations.

Of course, the invention is not limited to the embodiments described and represented herein, which have been provided only as examples.

We claim:

1. Protective housing for an optical component [4], consisting of a substrate made of a material carrying at least one integrated waveguide [6$_i$] that is extended beyond said substrate by optical fibers [7$_i$] exiting from the housing, with said housing defining a closed internal cavity [2] in which said component [4] is placed, characterized by the fact that said cavity [2] is sized such as to hold said component with a certain amount of play [j$_i$] that prevents a significant transmission of stresses between the housing and the component [4].

2. Housing in accordance with claim 1, characterized by the fact that it contains at east one flexible unit [12] [12'] [13] that is pressed slightly between two facing surfaces of the component [4] and of the cavity [2] in the housing [1] [3] in order to prevent potential vibrations of the component [4] in the cavity [2].

3. Housing in accordance with claim 2, characterized by the fact that said flexible unit is in the form of a lip [12] [12'] that is formed as a unit with the wall of the housing [1] [3] and that extends beyond one surface of the cavity [2] formed in this housing.

4. Housing in accordance with claim 2, characterized by the fact that said flexible unit is in the form of a flexible ribbing [13] formed on one wall of the cavity [2] in the housing.

5. Housing in accordance with any one of claims 1 to 4, characterized by the fact that it includes a base [1] in which the cavity [2] is formed, and a cover [3] that closes said cavity [2], with said cover [3] being provided with a plurality of clamping tabs [16$_i$] designed to cooperate with complementary ribbing [18] in the base [1], in order to ensure a temporary pre-assembly of the cover [3] and of the base [1] in a relative position that is different from the one that corresponds to their permanent assembly.

6. Housing in accordance with claim 5, characterized by the fact that the cover [3] has, on its outer surface, a recess [3$_1$] suitable for receiving a label.

7. Housing in accordance with claim 6, characterized by the fact that the base [1] and the cover [3] receive, in the area where the housing [1] [3] is crossed by the optical fibers [7$_i$] [8$_i$], watertight joints [9$_1$] [9$_2$] that are suitable for receiving in a complementary way the fibers [7$_i$] [8$_i$] in the form of a flat ribbon.

8. Housing in accordance with any one of claims 1 to 4 or 6, characterized by the fact that it has rounded surfaces [15$_i$] located at the points at which the optical fibers exit the housing, with said rounded surfaces being suitable for supporting the fibers by means of a pre-determined minimum radius of curvature (r).

9. Housing in accordance with any one of claims 1 to 4 or 6–7, provided with an integrated optical component [4].

10. Housing in accordance with claim 9, characterized by the fact that a water-repellent lubricant is provided in the space that separates the component [4] from the wall of the cavity [2].

* * * * *